No. 629,127. Patented July 18, 1899.
M. R. GEER.
RACK FOR FRYING FISH.
(Application filed Feb. 23, 1897.)
(No Model.)
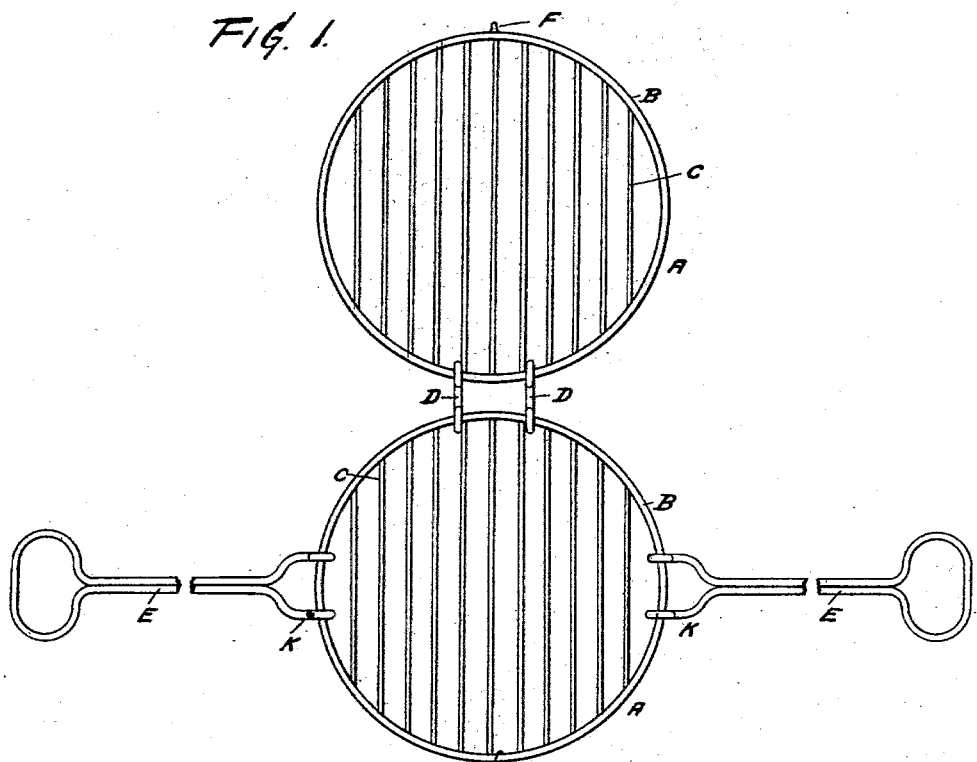
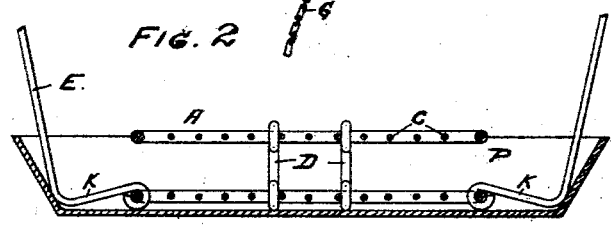
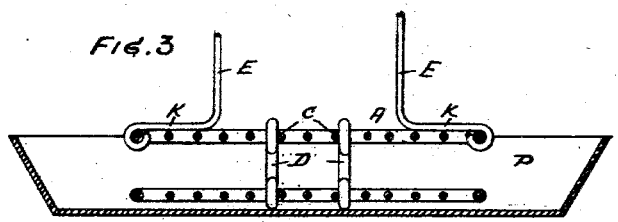
WITNESSES:
INVENTOR
Mary Ransom Geer

UNITED STATES PATENT OFFICE.

MARY RANSOM GEER, OF NEW YORK, N. Y.

RACK FOR FRYING FISH.

SPECIFICATION forming part of Letters Patent No. 629,127, dated July 18, 1899.

Application filed February 23, 1897. Serial No. 624,735. (No model.)

*To all whom it may concern:*

Be it known that I, MARY RANSOM GEER, a citizen of the United States, residing at New York, in the county and State of New York, have invented certain new and useful Improvements in Racks for Frying Fish, of which the following is a specification.

My invention relates to racks for frying fish; and the object thereof is to provide a device of this kind which is cheaply constructed, simple in operation, and to provide the handles with means to hold them in an upright position when the device is in use, so that they will not become unduly heated. I attain these objects by the mechanism illustrated in the accompanying drawings, in which—

Figure 1 is a plan view of my improved rack open ready to receive the fish to be fried. Fig. 2 is a vertical section of a frying-pan and my improved rack, showing the position of the rack in the pan and the construction of the handles; and Fig. 3 is a view similar to Fig. 2, but showing the rack reversed in the pan.

The same letters of reference refer to like parts in each of the views.

In the practice of my invention I provide a rack consisting of two frames A A, which are similar in shape and each of which consists of a rim B and cross-wires C. As shown in the drawings, the frames are circular in shape; but this is not essential and is conditional upon the shape of the frying-pan with which the rack is to be used. The frames are hinged together at one side by hinges D D, which are made of such a length that a fish of some size may be placed between the frames, and a lug F and chain G form a fastening device which allows of adjustment for fish of different sizes, as will be readily understood. The handles E E are pivotally connected with the opposite sides of one of the frames A and are preferably formed out of wire and provided with a loop through which the rim B passes, so that the handles may be easily turned on said rims, and adjacent to the point of connection with the rims the handles are bent to form an angular portion K, so that when the portion of the handles next to the frame are on a plane substantially parallel with the frames the main portion of the handles will stand substantially perpendicular to the frames.

In operation the fish is placed between the frames and secured in place by the chain G and lug F. Then by taking hold of the handles the rack can be set in the frying-pan P, and, as shown in Fig. 2, the angular part K of the handle E rests upon the bottom of the pan, while the main portion of the handle stands upright, free from the pan, so that it does not become unduly heated. When it is desired to turn the fish over, so that it can fry on the other side, the rack is lifted by the handles and can be easily turned, as will be readily understood, and when replaced in the pan the angular part K will now rest upon the cross-wires C, as clearly shown in Fig. 3, and the main portion of the handle will stand upright, as before, so that when in use the main portion of the handles are always kept free from contact with the pan to the great advantage of the party using the fryer.

As it is evident that many changes can be made in the shape and configuration of the rack and handles without departing from the spirit of my invention, I reserve the right to make all such changes.

Having described my invention, what I claim, and desire to secure by Letters Patent, is—

A rack for frying fish, consisting of two frames hinged together, and provided with means to secure them together in an adjustable manner; handles secured to one of said frames; and means to hold said handles in an upright position, consisting of an angular portion in each of said handles adjacent to the said frames, substantially as and for the purpose set forth.

In testimony whereof I have signed this specification in the presence of two subscribing witnesses.

MARY RANSOM GEER.

Witnesses:
 FREDERICK BARNARD RUSSELL,
 GEORGE ANDREW SHEPARD.